(12) United States Patent
Winstead et al.

(10) Patent No.: US 7,143,727 B1
(45) Date of Patent: Dec. 5, 2006

(54) EXHAUST REDUCTANT GENERATION IN A DIRECT INJECTION ENGINE WITH CYLINDER DEACTIVATION

(75) Inventors: Vince Winstead, Farmington Hills, MI (US); Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/245,265

(22) Filed: Oct. 5, 2005

(51) Int. Cl.
*F01L 1/34* (2006.01)
*F02D 13/06* (2006.01)
*F02D 17/02* (2006.01)
*F02D 7/00* (2006.01)

(52) U.S. Cl. .............................. 123/90.15; 123/568.14; 123/198 F; 123/481

(58) Field of Classification Search ............. 123/90.11, 123/90.15, 90.16, 90.17, 568.11, 568.14, 123/198 F, 481
See application file for complete search history.

(56) References Cited

U.S. PATENT DOCUMENTS

| | | | |
|---|---|---|---|
| 6,526,745 B1 * | 3/2003 | Ogiso | 60/285 |
| 6,647,947 B1 * | 11/2003 | Boyer et al. | 123/198 F |
| 6,729,126 B1 | 5/2004 | Ogiso et al. | |
| 6,742,327 B1 | 6/2004 | Inoue et al. | |
| 6,857,264 B1 * | 2/2005 | Ament | 60/284 |
| 2003/0150208 A1 | 8/2003 | Hirata et al. | |
| 2005/0028517 A1 | 2/2005 | Nakagawa et al. | |
| 2005/0131618 A1 * | 6/2005 | Megli et al. | 701/101 |
| 2005/0166900 A1 * | 8/2005 | Song et al. | 123/481 |

FOREIGN PATENT DOCUMENTS

JP 11-62566 * 3/1993

* cited by examiner

*Primary Examiner*—Hai Huynh
(74) *Attorney, Agent, or Firm*—Allan J. Lippa; Alleman Hall McCoy Russell & Tuttle LLP (57) ABSTRACT

A method for operating an internal combustion engine having at least a first and second cylinder, comprising during at least one operating condition, operating the first cylinder to receive directly injected fuel, mix said fuel with fresh air inducted past an intake valve of the first cylinder, combust said mixture, and exhaust at least a portion of said mixture past an exhaust valve of the first cylinder, and concurrent with said operation of the first cylinder, operating the second cylinder to hold an intake valve of the second cylinder closed for at least a cycle of said second cylinder, receive directly injected fuel, and then exhaust at least a portion of said fuel past an exhaust valve of the second cylinder to generate unburned reductants in an exhaust of the engine.

19 Claims, 7 Drawing Sheets

EXHAUST REDUCTANT GENERATION IN A DIRECT INJECTION ENGINE WITH CYLINDER DEACTIVATION

FIELD

The present application relates to a system and method for controlling engine operation to generate a rich exhaust gas.

BACKGROUND AND SUMMARY

Engines use various types of emission control devices to treat emissions in exhaust gas. The devices may use various types of materials to treat emissions, including precious metals and other catalysts. In some types of devices, the materials may have the ability to chemically or physically store oxidants, such as oxygen and/or NOx, during certain operating conditions. For example, some devices store oxidants during excess oxygen conditions. Likewise, some devices may release and/or convert stored oxidants under stoichiometric or oxygen deficient conditions.

Under some conditions, it may be desirable to generate a rich exhaust gas mixture to release and/or convert stored oxidants in an emission control device coupled to an engine's exhaust. One approach that attempts to reduce NOx in a catalyst is described by U.S. Pat. No. 6,729,126. In this approach, a variable valve control system adapted for changing the opening and closing timing of an exhaust valve is controlled so as to temporarily place the exhaust valve in an open position for a period of time before a moment of initiation of an exhaust stroke of the cylinder and then place the exhaust valve in the open position again during the exhaust stroke. Such operation is used when an exhaust gas emitted from the corresponding cylinder is desired to contain a reducing component for reducing NOx.

However, the inventors herein have recognized a potential disadvantage with such an approach, at least under some conditions. For example, it can be difficult to determine how much fuel and/or air is actually exhausted during the first opening of the exhaust valve, and thus the combustion air-fuel ratio may be too rich or too lean. Such variation can also result in inappropriate ignition timing, which can increase exhaust emissions and reduce fuel economy.

In one approach, at least some of the above disadvantages may be overcome by a method for operating an internal combustion engine having at least a first and second cylinder. The method comprises, during at least one operating condition, operating the first cylinder to receive directly injected fuel, mix said fuel with fresh air inducted past an intake valve of the first cylinder, combust said mixture, and exhaust at least a portion of said mixture past an exhaust valve of the first cylinder; and concurrent with said operation of the first cylinder, operating the second cylinder to hold an intake valve of the second cylinder closed for at least a cycle of said second cylinder, receive directly injected fuel, and then exhaust at least a portion of said fuel past an exhaust valve of the second cylinder to generate unburned reductants in an exhaust of the engine.

In this way, it is possible to provide reductant during cylinder deactivation operation while reducing any interruption of the combustion air-fuel mixture of the remaining cylinders carrying out combustion.

In another example, advantages may be achieved by a method for operating an internal combustion engine having at least a first and second cylinder. The method comprises operating with said second cylinder in a cylinder deactivation mode and said first cylinder carrying out combustion; and during said operation, directly injecting fuel into said second cylinder and temporarily opening an exhaust to provide unburned hydrocarbons to an exhaust of the engine.

Again, such operation enables the ability to generate unburned hydrocarbons in an engine's exhaust during cylinder deactivation while reducing any interruption of the combustion air-fuel mixture or spark timing errors of the remaining cylinders carrying out combustion.

Note that there are various types of direct injection systems, including high and low pressure systems, cylinder head injectors, side wall injectors, and various others.

DETAILED DESCRIPTION

Figure 1:
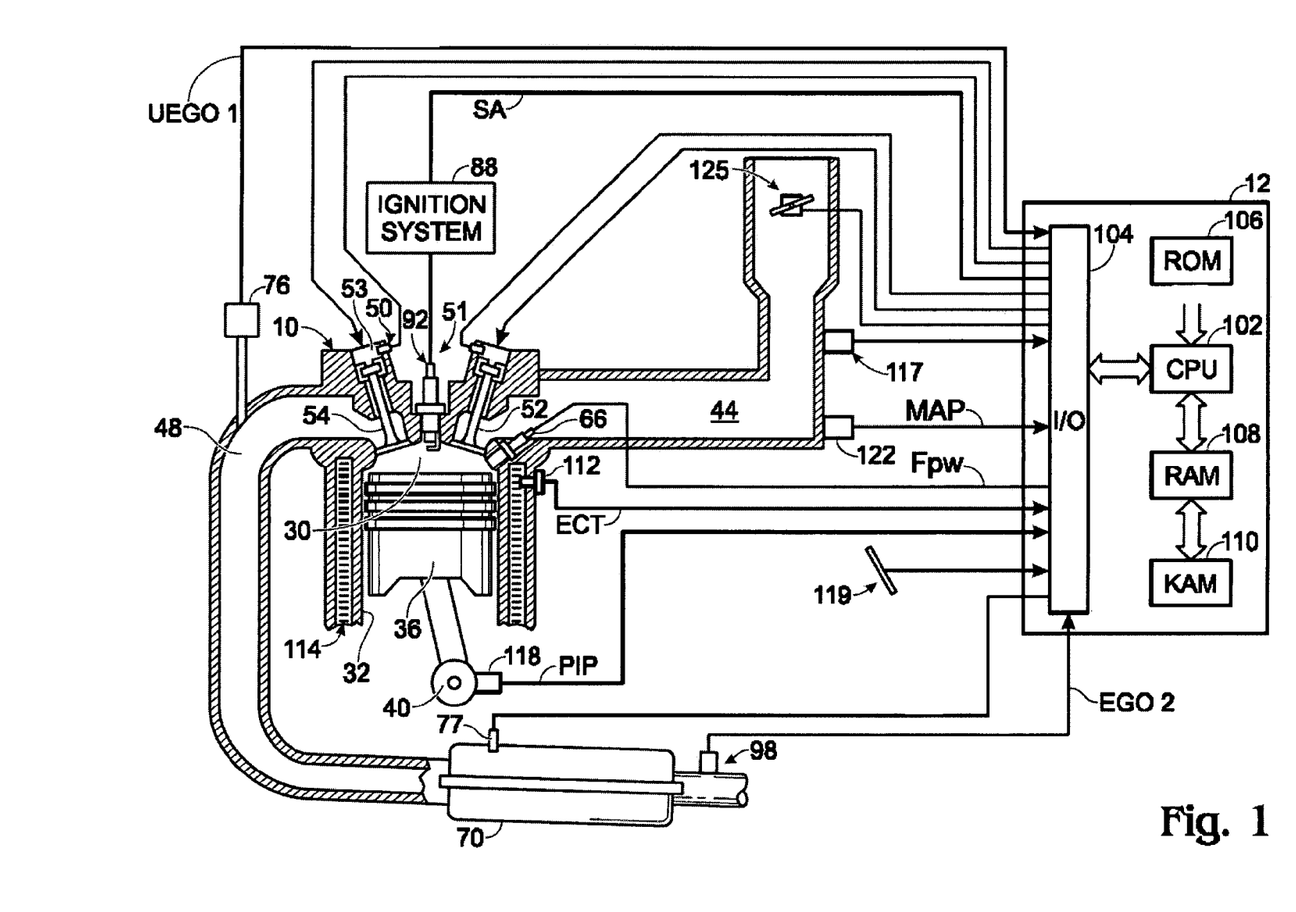
FIG. 1 is a schematic diagram of an engine.
Figure 2:
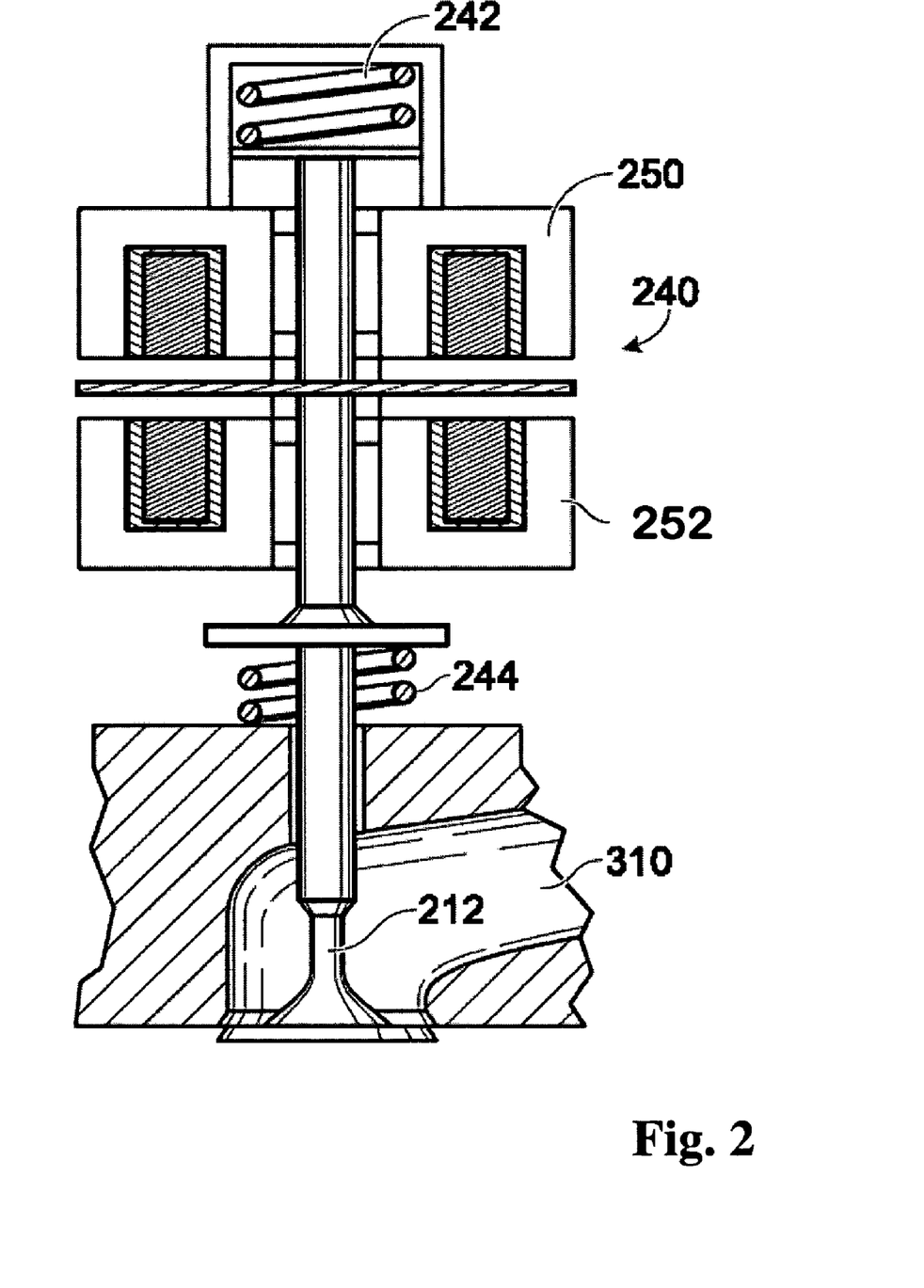
FIG. 2 is a schematic diagram of an engine valve.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. Each intake and exhaust valve is operated by an electromechanically controlled valve coil and armature assembly 53, such as shown in FIG. 2. Armature temperature is determined by temperature sensor 51. Valve position is determined by position sensor 50. In an alternative example, each of valves actuators for valves 52 and 54 has a position sensor and a temperature sensor.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). The engine 10 of FIG. 1 is configured such that the fuel is injected directly into the engine cylinder, which is known to those skilled in the art as direct injection. In addition, intake manifold 44 is shown communicating with optional electronic throttle 125. Alternatively, or in addition, a port fuel injector may also be used. In one example, a low pressure direction injection system may be used, where fuel pressure can be raised to approximately 20–30 bar. Alternatively, a high pressure, dual stage, fuel system may be used to generate higher fuel pressures.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only memory 106, random access memory 108, 110 keep alive memory, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof.

FIG. 2 shows an example dual coil oscillating mass actuator 240 with an engine valve actuated by a pair of opposing electromagnets (solenoids) 250, 252, which are designed to overcome the force of a pair of opposing valve springs 242 and 244. FIG. 2 also shows port 310, which can be an intake or exhaust port). Applying a variable voltage to the electromagnet's coil induces current to flow, which controls the force produced by each electromagnet. Due to the design illustrated, each electromagnet that makes up an actuator can only produce force in one direction, independent of the polarity of the current in its coil. High performance control and efficient generation of the required variable voltage can therefore be achieved by using a switch-mode power electronic converter.

As illustrated above, the electromechanically actuated valves in the engine remain in the half open position when the actuators are de-energized. Therefore, prior to engine combustion operation, each valve goes through an initialization cycle. During the initialization period, the actuators are pulsed with current, in a prescribed manner, in order to establish the valves in the fully closed or fully open position. Following this initialization, the valves are sequentially actuated according to the desired valve timing (and firing order) by the pair of electromagnets, one for pulling the valve open (lower) and the other for pulling the valve closed (upper).

The magnetic properties of each electromagnet are such that only a single electromagnet (upper or lower) need be energized at any time. Since the upper electromagnets hold the valves closed for the majority of each engine cycle, they are operated for a much higher percentage of time than that of the lower electromagnets.

While FIG. 2 shows the valves to be permanently attached to the actuators, in practice there can be a gap to accommodate lash and valve thermal expansion.

Figure 3:
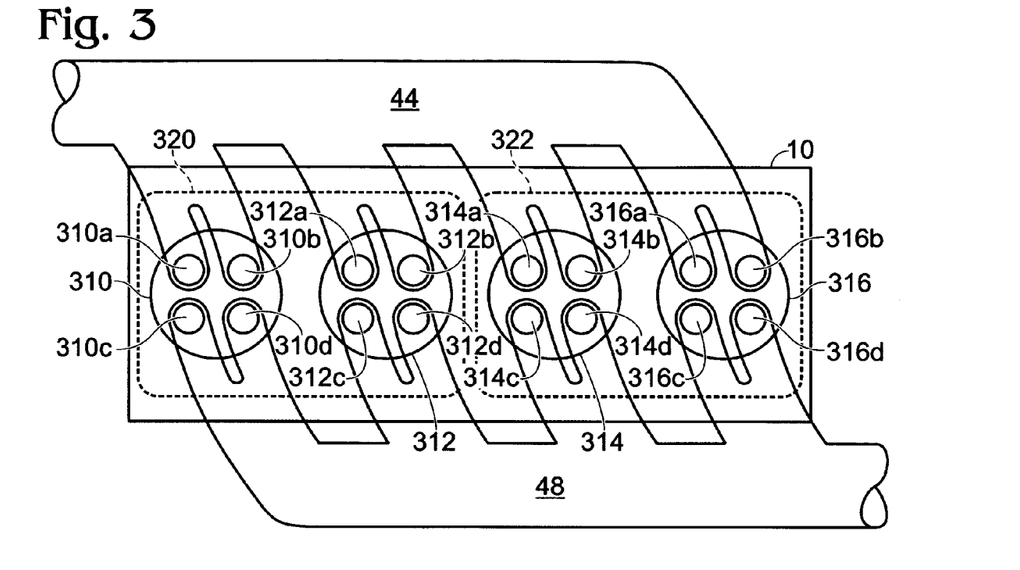
FIGS. 3–4 is a schematic diagram showing example engine cylinder configurations.

Referring now to FIG. 3, engine 10 is shown as an example inline four-cylinder engine having each cylinder coupled to a common intake manifold 44 and a common exhaust manifold 48. While this example shows each cylinder coupled to common intake and exhaust manifolds, separate exhaust manifolds for one cylinder, or groups of cylinders, may be used, if desired. One such example is described below herein with regard to FIG. 4.

Continuing with FIG. 3, four cylinders 310, 312, 314, and 316 are shown in an inline configuration. As described below, various other engine configurations and numbers of cylinders may be used, if desired. Each of cylinders 310–316 have four valves per cylinder, labeled a, b, c, and d. Thus, in this example, cylinder 310 has four valves, 310a, 310b, 310c, and 310d. Likewise, cylinder 312 has four valves, 312a, 312b, 312c, and 312d, cylinder 314 has four valves, 314a, 314b, 314c, and 314d, and cylinder 316 has four valves, 316a, 316b, 316c, and 316d. While this example has four valves per cylinder, various other configurations may be used, such as, for example, three valves per cylinder, two valves per cylinder, or combinations thereof.

As shown by FIG. 3, valves with subscript "a" are each in a common location in the cylinder. Likewise, valves with subscript "b" are each in a common location, and so on with subscripts "c" and "d."

In the example of FIG. 3, each cylinder valve may be electrically actuated without the use of a camshaft. Alternatively, some of the cylinder valves may be electrically actuated and some may be cam actuated. The cam actuated valves may have fixed cam timing, or may have variable cam timing. Further, the cam actuated valves may be mechanically deactivated, such as by deactivating a lifter or pushrod, for example.

FIG. 3 shows that each cylinder has two valves coupled to an intake side of the engine (a, b) and two valves coupled to an exhaust side of the engine (c, d). As noted above, different numbers of valves may be used, for example two intake side valves and a single exhaust side valve. Further, as noted above, some valves, such as intake side valves, can be electrically actuated, while some valves, such as exhaust side valves, may be cam actuated.

Continuing with the engine of FIG. 3, the cylinders may be grouped together into groups 320 and 322, where group 320 includes cylinders 310 and 312, and group 322 includes cylinders 314 and 316. This is just one example grouping, and the cylinders may be grouped in other ways, if desired. For example, cylinders 312 and 314 may be one group, and cylinders 310 and 316 another group. As described below herein, the cylinder groups may be operated in selected configurations to provide improved engine exhaust heat and improved performance.

Figure 4:
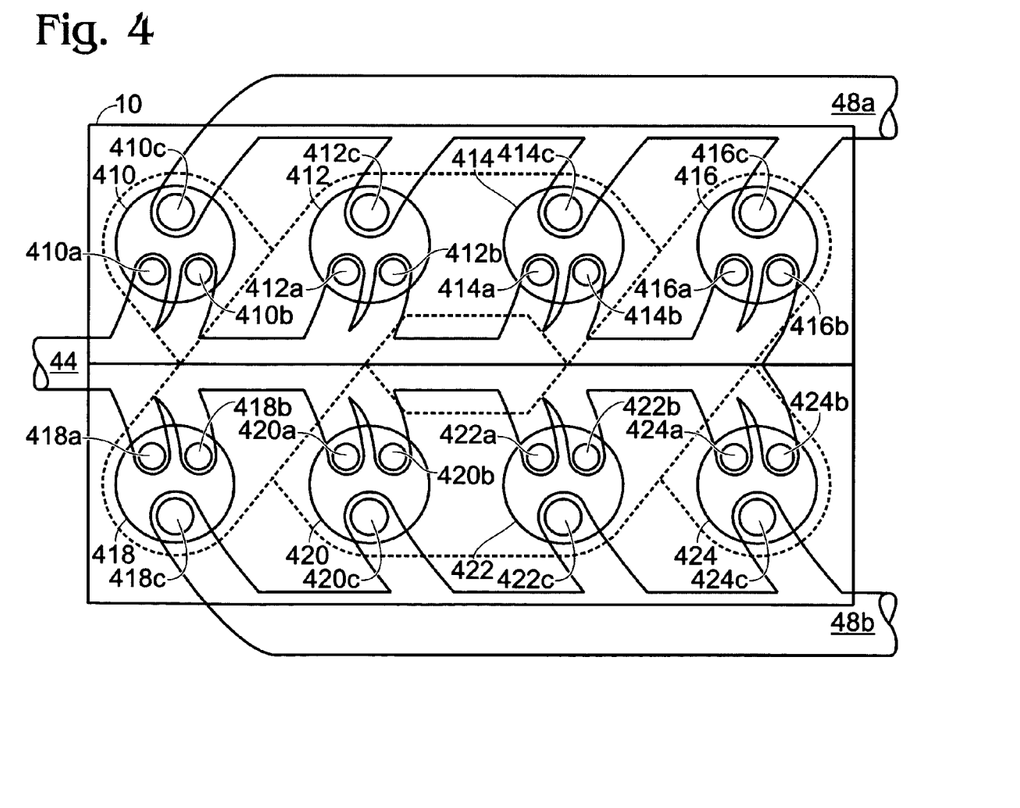

Referring now to FIG. 4, an example V-8 engine is shown having eight cylinders 410, 412, 414, 416, 418, 420, 422, and 424. In this example, cylinders 410–416 are in a first bank, and cylinders 418–424 are in a second bank. While the banks of the engine may constitute cylinder groups, in another example, the cylinders are grouped based on firing order considerations. For example, as shown in FIG. 4, cylinders 410, 420, 422, and 416 constitute group 430, and cylinders 418, 412, 414, and 424 constitute group 432. Note also that more than two groups of cylinders may be used, if desired, and cylinder groups do not necessary have the same number of cylinders, although they may in one example.

FIG. 4 shows that each cylinder has three cylinder valves (a, b, and c). Thus, in this example, cylinder 410 has three valves, 410a, 410b, and 410c. Likewise, cylinder 412 has three valves, 412a, 412b, and 412c, etc., up through cylinder 424 which has valves, 424a, 424b, and 424c. While this example has three valves per cylinder, various other configurations may be used, such as, for example, four valves per cylinder, two valves per cylinder, or combinations thereof.

In the example of FIG. 4, each cylinder valve may be electrically actuated without a camshaft. Alternatively, some of the cylinder valves may be electrically actuated and some may be cam actuated. The cam actuated valves may have fixed cam timing, or may have variable cam timing. Further, the cam actuated valves may be mechanically deactivated, such as by deactivating a lifter or pushrod, for example.

FIG. 4 shows that each cylinder has two valves coupled to an intake side of the engine (a, b) and one valve coupled to an exhaust side of the engine (c). As noted above, different numbers of valves may be used, for example two intake side valves and two exhaust side valves. Further, as noted above, some valves, such as intake side valves, can be electrically actuated, while some valves, such as exhaust side valves, may be cam actuated. Also, FIG. 4 shows a split exhaust manifold (48*a* and 48*b*), however a common exhaust manifold may be used, if desired. Further, the split exhaust manifolds may form separate exhaust paths to atmosphere, or be joined together in a Y-pipe configuration. The joining may be upstream and/or downstream of emission control devices.

As will be described in more detail below, the cylinders may be grouped in various ways and numbers, and then the cylinders in one group operated in common and cylinders in another group also operated in common, yet differently than those in the first group. For example, cylinders in group 320 can be operated to be deactivated (e.g., valves held closed) while cylinders in group 322 carry out combustion.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the disclosure, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 5:
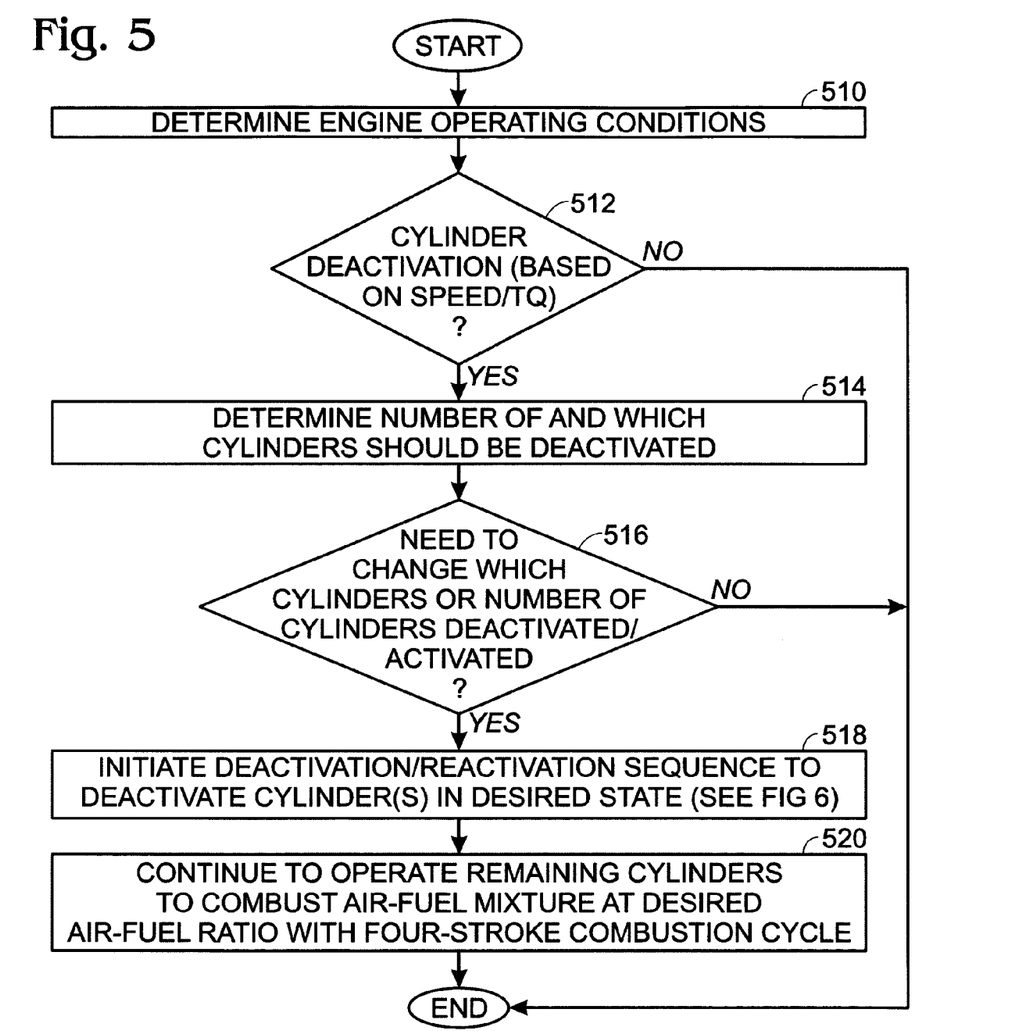
FIGS. 5–10 are flowcharts of example methods for controlling engine operation with cylinder deactivation.

Referring now to FIG. 5, a routine is described for controlling whether to utilize cylinder deactivation. As described above, cylinder deactivation may be achieved by holding electrically actuated valves closed. Alternatively, mechanically deactivated intake and/or exhaust valves may be used in which the valves are deactivated in a predetermined sequence or firing order, and to fill the deactivated cylinders with combusted gasses, for example.

First, in 510, the routine determines engine operating conditions, including engine speed, engine load, engine torque, or combinations thereof. Then, in 512, the routine determines whether one or more cylinders should be deactivated (e.g., operated with both intake and exhaust valve(s) held closed during one or more cycles of the cylinder. In one example, the determination of 512 may be based on engine speed and desired engine torque. Other parameters, such as engine temperature, exhaust temperature, time since engine start, and others may also be used, if desired.

If the answer to 512 is yes, then the routine proceeds to 514, where the routine determines a number of cylinders (and which cylinders) should be deactivated. For example, different cylinders may be deactivated under different conditions to provide even wear, unequal exhaust heat generation, or to provide different engine vibration characteristics under different operating conditions. Further, different numbers of cylinders may be deactivated in different speed and/or torque regions to improve overall engine operation. Next, the routine determines, based on the desired number of deactivated cylinders and which cylinders are desired to be deactivated, whether any of the cylinders need to change operation. I.e., the routine determines whether any cylinders need to initiate combustion, or be deactivated. For example, even if the number of cylinders deactivated is the same, some cylinders may still need to be activated/deactivated since different cylinders may be selected to operate. If the answer to 516 is yes, the routine continues to 518 to initiate a deactivation sequence for cylinders to be deactivated, if any, and to initiate an activation sequence for cylinders to be activated, if any. Such operation is described in more detail below herein with regard to FIG. 6, for example. Then, in 520, the routine continues to operate the remaining cylinders to combust an air-fuel mixture at a desired air-fuel ratio with a four-stroke combustion cycle.

In this way, the routine can operate the engine to provide improved fuel economy and engine performance by utilizing cylinder deactivation.

Figure 6:
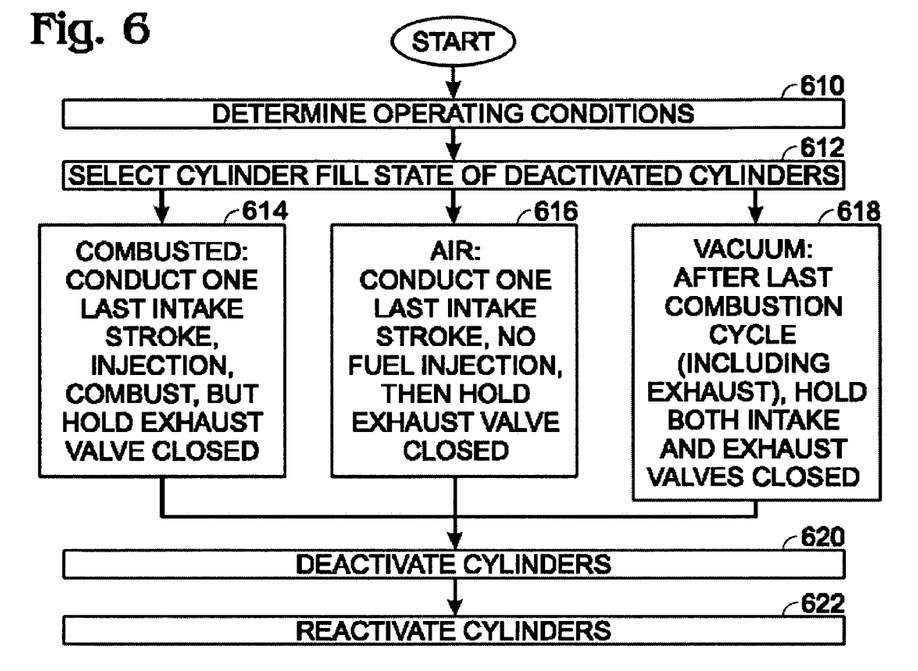

Referring now to FIG. 6, a routine is described for selecting and carrying out different cylinder deactivation/activation operation depending on operating conditions and engine cylinder status.

First, in 610, the routine determines engine operating conditions, such as engine speed, engine load, desired engine torque, temperature, and others. Then, in 612, the routine determines a desired cylinder fill state for deactivated cylinders. Specifically, the routine determine the desired cylinder contents, such as combusted gasses (and the air-fuel ratio of those gasses), fresh air, a vacuum, and/or combinations thereof. Further, the routine determines an amount of the fill contents, and thus an operating pressure range, for the deactivated cylinder(s). If a combusted gas is selected, the routine continues to 614. If fresh air is selected, the routine continues to 616. And finally, if a vacuum is selected, the routine continues to 618.

In 614, the routine operates one or more cylinders to be deactivated to carry out an intake stroke by operation of the intake valve(s), and receive injected fuel, which mixture is then combusted, but not exhausted in the next exhaust stroke as the exhaust valve(s) remain closed. The intake valve timing and fuel injection amount can be used to select the amount of gasses and the air-fuel ratio of the combusted gasses. For example, control of intake valve timing may be used to give a desired amount of air, while control of fuel injection may be used to give a desired air/fuel ratio of the combustion mixture. In this way, combusted gasses may be trapped in the cylinder and used to keep oil out of the cylinder volume but also maintain a small cycle average pumping loss for the non-operating cylinders, if desired. Further, when reactivating a cylinder deactivated to trap exhaust gas, the reactivation can commence with operation of the exhaust valve(s) so that the cylinder is then ready to perform an intake stroke and start four-cycle combustion, as described below.

In 616, the routine operates one or more cylinders to be deactivated to carry out an intake stroke (by operation of the intake valve(s) without injected fuel to trap fresh charge in the cylinder. Again, control of intake valve timing may be used to vary an amount of fresh charge trapped in the cylinder. Further, when reactivating a cylinder deactivated to trap fresh charge, the reactivation can commence with fuel injection and combustion before reactivating any of the engine valves, followed by an exhaust stroke so that the cylinder is then ready to perform an intake stroke and start four-cycle combustion, as described below.

In 618, the routine operates one or more cylinder to be deactivated to finish a previous exhaust stroke, and then deactivate the cylinder valves without performing an intake stroke (or performing a reduced intake stroke) and without fuel injection. Again, variation of intake and/or exhaust valve timing may be used to vary a level of vacuum in the cylinders. Reactivation can then commence with an intake stroke.

In another example, the cylinders may be filled with a mixture of fresh and combusted gasses, for example by using a lean air-fuel mixture, so that after combustion, there is still a portion of fresh charge in the cylinder.

From any of 614, 618, and 616, the routine continues to 620 to carry out the selected deactivation sequence, if any cylinders are to be deactivated. Then, the routine continues to 622 to carry out a reactivation sequence if any cylinders are to be reactivated. When reactivating cylinders, in one example, different reactivation sequences may be used depending on the fill state of the cylinder to be reactivated. For example, if reactivating a cylinder filled with combusted gasses, the exhaust valve is first opened during an exhaust stroke (to exhaust the gasses to the exhaust manifold), and then the intake valve(s) is/are reactivated during the immediately following intake stroke (to induct a fresh charge from the intake manifold). See FIGS. 10–11, for example. Also, during either or both of activation and deactivation, changes in intake valve timing and fuel injection amount of combusting cylinders can be used to maintain engine torque substantially smooth. Further, adjustments of the throttle, spark timing, and unlocking of a torque converter can also be used during transitions in the number of active cylinders to smooth engine torque.

Alternatively, if reactivating a cylinder filled with air, the intake valve is first opened during an exhaust stroke (to exhaust the fresh air back into the intake manifold, rather than the exhaust manifold), and then the intake valves are maintained open during the immediately following intake stroke to induct a fresh charge from the intake manifold. After combustion of the mixture, the exhaust valve(s) is/are opened to exhaust the combusted mixture according to a four stroke combustion cycle. Finally, if reactivating a cylinder with a vacuum, the intake valve(s) is/are first opened during an intake stroke. Again, after combustion of the mixture, the exhaust valve(s) is/are opened to exhaust the combusted mixture according to a four stroke combustion cycle.

In this way, it is possible to deactivate cylinders with a desired fill state, and then reactivate cylinders with appropriate valve timing so that exhaust air-fuel ratio is not disturbed and combustion can be effectively carried out.

Figure 7:
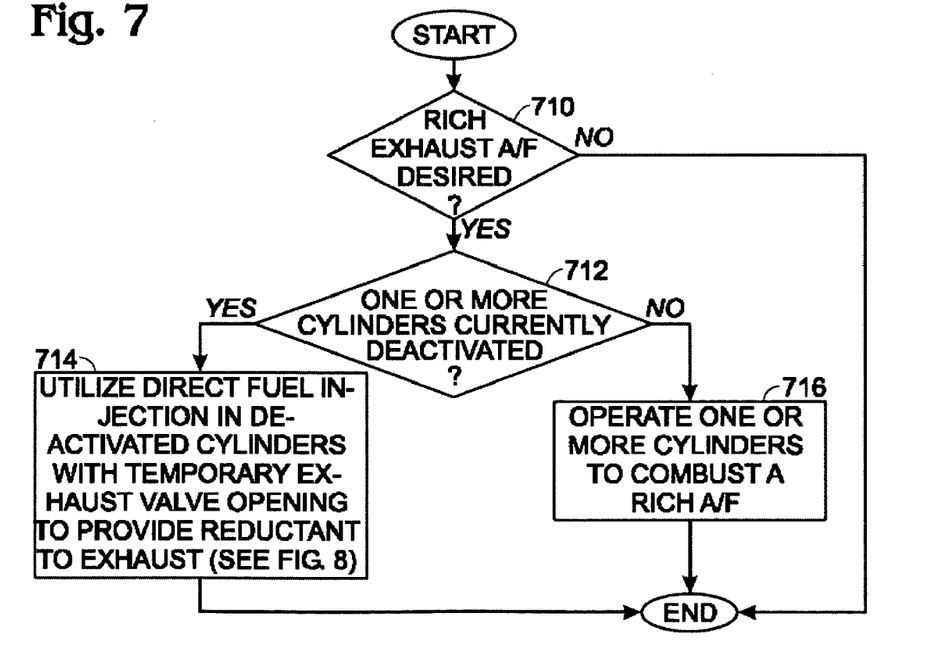

Referring now to FIG. 7 a routine is described for determining when reductant is desired in the exhaust. Such conditions may be desired to purge an emission control device of stored oxidants, or to control an oxidant (e.g., oxygen) storage amount in an emission control device. Further, still other conditions may generate a need for reductant, such as a need for unburned hydrocarbons, in the exhaust. Such a condition is determined in 710 by determining whether a rich exhaust air-fuel ratio is desired. Alternatively, the routine may simply determine whether reductant in the exhaust is desired. If so, the routine continues to 712 to determine whether one or more cylinders are currently deactivated. If so, the routine continues to 714 to utilize direct fuel injection in deactivated cylinders with temporary exhaust valve opening to provide reductant to the exhaust, without generating significant engine torque (i.e., without combusting the fuel while it is in the cylinder), as described in more detail herein with regard to FIGS. 8, and 10–11, for example. Remaining (activated) cylinders can be operated about stoichiometry using a four-stroke combustion cycle to generate engine torque. Alternatively, one or more remaining cylinders can be operated lean or rich.

If the answer to 712 is no, the routine continues to 716 to operate one or more activated cylinders to carry out combustion of a rich air-fuel ratio. Note that other cylinders can be operated about stoichiometry, or all of the cylinders may be operated rich. From 714, 716, or when the answer to 710 is no, the routine ends. In this way, if the engine is operating with deactivated cylinders, those cylinders may be used to advantage to generate exhaust reductant without disturbing combustion and air-fuel mixing in the remaining cylinders, if desired. Alternatively, if no cylinders are deactivated, desired reductants can still be provided.

Figure 8:
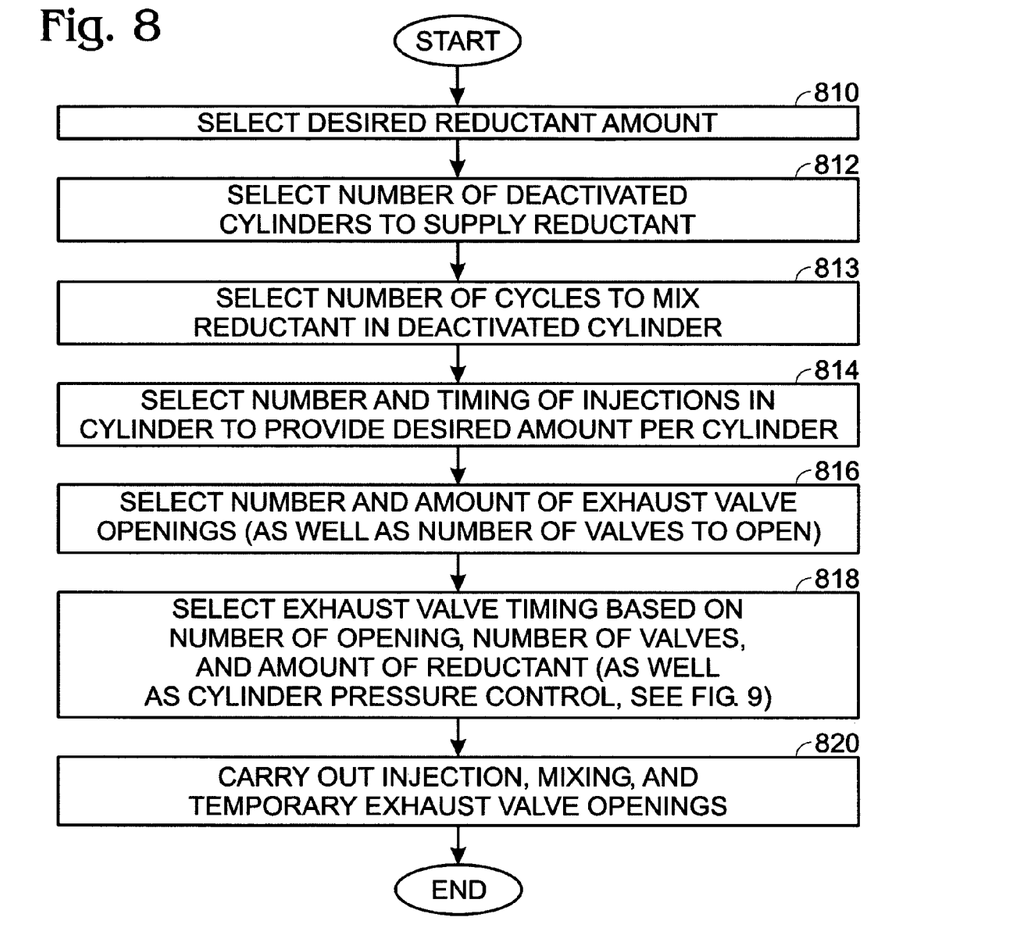

Referring now to FIG. 8, a routine is described for selecting when and how to provide reductant, such as unburned hydrocarbons, in the exhaust from deactivated cylinders. First, in 810, the routine selects (or varies) a desired amount of reductant to be provided. This may be based on an estimated amount of oxidants stored in an emission control devices, engine speed, engine load, temperature, and/or various other factors or combinations thereof. For example, the amount of reductant provided in the exhaust may be varied to provide a selected exhaust overall air-fuel ratio. Then, in 812, the routine selects (or varies) a number of deactivated cylinders that may be used to supply reductant. For example, even if four cylinders are deactivated, only a single cylinder may be selected to provide reductant. Alternatively, all deactivated cylinders may be used to provide reductant. In 813 the routine continues to select (or vary) a number of cycles to mix, or pre-mix, the injected fuel before exhausting the mixture of cylinder gasses and injected fuel. For example, under cold engine temperature (e.g., lower engine coolant temperature), more cycles may be used to mix the gasses and fuel than under higher temperatures. In this way, it may be possible to reduce cylinder wall wetting of deactivated cylinders to reduce emissions upon reactivation, for example. The number of mixing cycles/strokes, number of cylinders to supply reductant, and amount of reductant may also be further varied as other engine operating parameters vary, in addition to or in place of those mentioned above.

Continuing with FIG. 8, in 814 the routine selects (or varies) a number and timing of fuel injections in cylinders selected to provide the desired amount of reductant, so that the a desired reductant/cylinder is achieved. The number of injections may be varied to provide variable amounts of mixing, or to ensure a desired amount of fuel is provided if the amount of fuel injection per stroke is limited by cylinder pressure. The number and/or timing may be varied with an amount of trapped gas (or vacuum) in the cylinder, an amount of reductant to be provided, exhaust temperature, engine temperature or others. Further, the fuel injection can be timed during either intake and/or combustion strokes to have a smaller impact on pumping loss reduction, if desired. I.e., the fuel injection itself does not take up an appreciable amount of volume in the cylinder and therefore does not adversely impact the cycle average pumping.

In 816, the routine selects (or varies) a number and amount of exhaust valve openings (as well as a number of valves to open if more than one exhaust valve is present) based on (or with) variation of one or more of a number of factors, such as exhaust pressure, exhaust temperature, exhaust flow rate, or others. For example, a sufficient number of injections can be stored to affect a complete or partial purge of NOx in the example of a NOx trap purge. Also, the above parameters may be varied to change the NOx purging rate (e.g., slower or faster).

Figure 9:
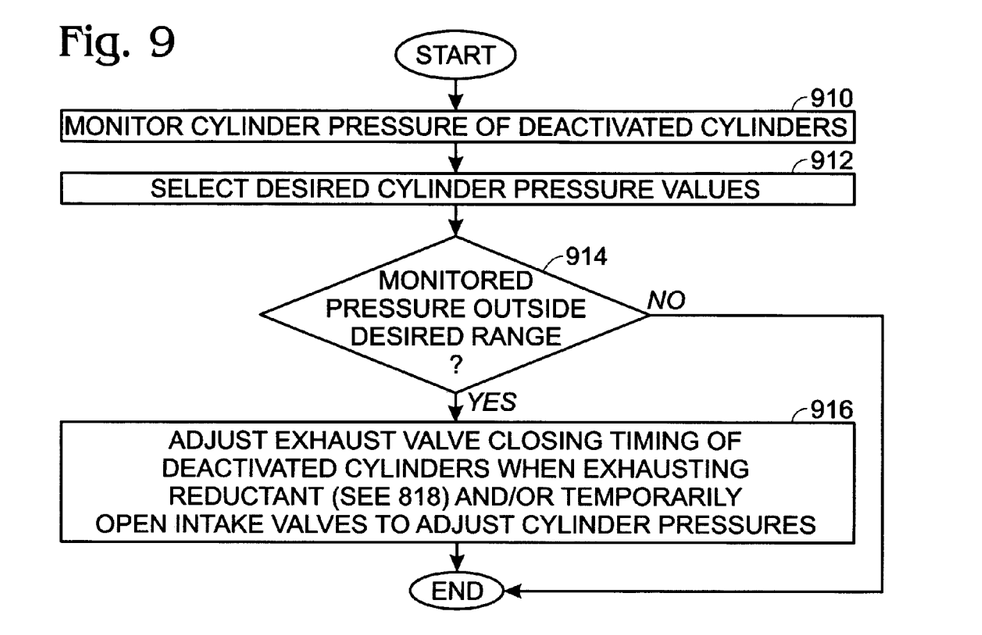

Then, in 818, the routine selects (or varies) an exhaust valve timing based on one or more of (or variation with) a number of openings of the valve, a number of exhaust valves opened per cylinder, an amount of reductant, as well as cylinder pressure (see FIG. 9). In 820, the routine then carries out (or varies) the fuel injection, mixing, and temporary exhaust valve openings as selected. In this way, it is possible to accommodate various operating conditions and achieve improved overall performance.

Note that in one example, recharging of exhaust pressure in a deactivated cylinder can be performed by opening and closing an exhaust valve at appropriate times. For example, exhaust gas pressure in a deactivated cylinder may be reduced over time due to blow-by. As such, appropriate timing of exhaust valve opening and closing may be used to replenish or increase trapped gasses and cylinder pressure if the cylinder pressure or amount of gas contents falls below a threshold value.

Referring now to FIG. 9, a routine is described for controlling deactivated cylinder pressure. First, in 910, the routine monitors cylinder pressures (e.g., average, profile, peak values, etc.). The pressure may be monitored via a sensor or estimated based on other operation conditions, such as valve timing, manifold pressure, exhaust pressure, engine speed, etc. Further, these conditions may be used directly as an indication of cylinder pressure. Then, in 912, the routine selects a desired cylinder pressure. The pressure may be selected to provide various results, such as, for example, the cycle strokes cause alternating cylinder pressurization and de-pressurization keeping oil out of the cylinder volume but also maintaining a small cycle average pumping loss for the non-operating (deactivated) cylinders.

In 914, the routine determines whether the monitored pressure of 910 is outside the desired range of 912. If so, the routine continues to 916 to adjust valve timing of deactivated cylinders. For example, the routine may adjust the closing timing of the temporary exhaust valve opening to provide reductant (see 818). Alternatively, or in addition, the routine may temporarily open intake valves to adjust cylinder pressure of deactivated cylinders, depending on the desired fill gasses of the cylinder. In this way, cylinder pressure of deactivated cylinders can be controlled accurately, while still using the deactivated cylinder to provide reductant to the exhaust.

Figure 10:
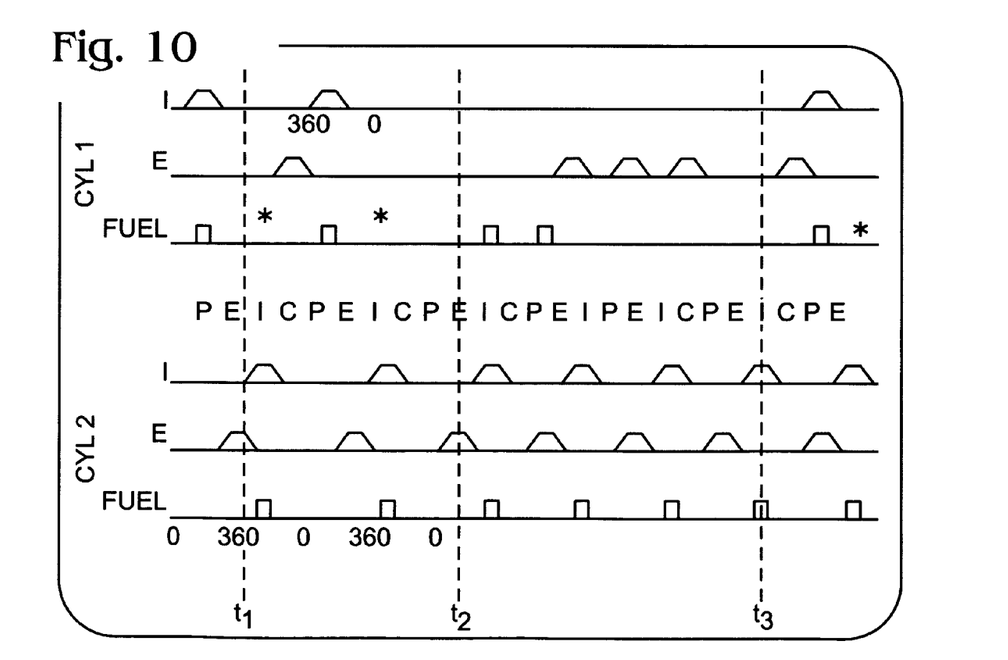

Referring now to FIG. 10, a graph shows example cylinder valve and injection timing with cylinder deactivation and providing reductant to the exhaust. In particular, this example shows cylinder deactivation to trap burnt gasses, and the injection during deactivation to generate unburned HC in the exhaust, where multiple fuel injections are used, with multiple mixing strokes. Specifically, the top set of graphs show intake (I), exhaust (E), and fuel injection timing relative to crank angle (with 0 degrees representing is top-dead-center of compression assuming a four-stroke cycle—but note a four stroke cycle is not always performed, rather this is simply for reference). The asterisk (*) represent approximate spark timing. As shown in FIG. 10, at time t1, cylinder 1 is selected to be deactivated. Then, at time t2, it is desired to generate exhaust reductants, which causes fuel injection into cylinder 1 at two downward piston strokes, and then three openings of the exhaust valve to provide said reductant to the exhaust.

Thus, in FIG. 10, a catalyst purge may be used to trigger the injection of fuel after time t2 and exhaust valve opening so that the fuel contained in the non-operating cylinders can (in the next compression and/or exhaust stroke) be sent (immediately, or one or more cycles later) to the exhaust with reduced exhaust pressure transients and reduced intake pressure transients. Then, once the non-operating cylinders storing fuel complete respective compression or exhaust strokes to expel at least some of the reductants to the exhaust, exhaust charge can be inducted into the cylinder via exhaust valve timing selection (or air charge can be inducted into the cylinder via the intake valves) to return the cylinder to nominal non-operating pumping behavior with intake and exhaust valves closed. Once the purge is complete, the cylinders can be freely configured for another purge or for other operation (or remain deactivated), if desired.

Figure 11:
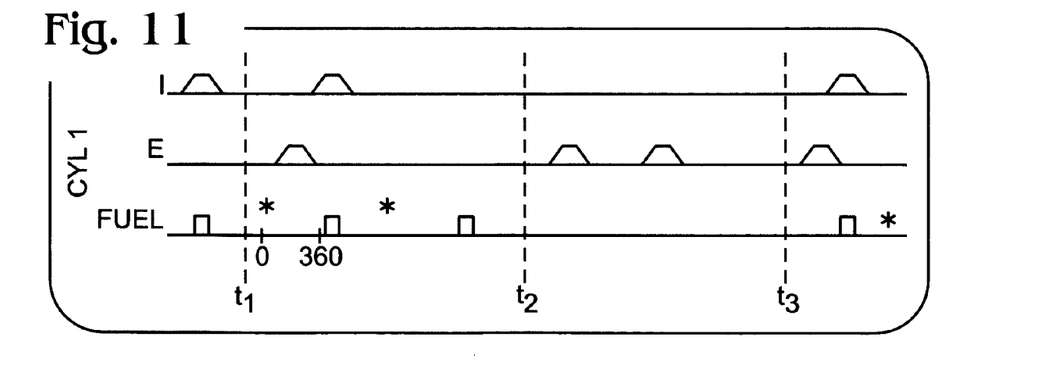
FIGS. 11–12 are plots of example valve timing and fuel injection during engine operation.

FIG. 11 shows an alternative example of cylinder 1 operation, where only a single injection is provided even before it is determined that exhaust reductant is need to enable additional mixing and preparation so that as soon as such reductant is desired (at t2), it can be quickly provided.

Figure 12:
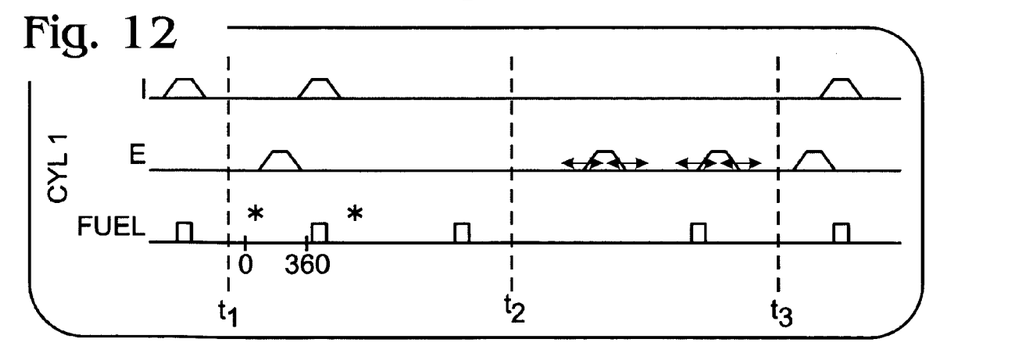

FIG. 12 shows still another example of cylinder 1 operation, where exhaust valve timing is adjusted (as shown by the arrows) to vary cylinder pressure, an amount of exhausted reductant, etc.

Thus, in this way, it is possible to provide reductants to, for example, purge a catalyst in the exhaust during cylinder deactivation, while reducing disturbances of the air-fuel ratio of the cylinders carrying out combustion. Further, it may be possible to achieve faster catalyst purging since greater amounts of reductant can be supplied to the exhaust, while reducing purging duration. While the above example uses a directly injected injection with electrically actuated valves, any technology which allows firing of a selectable subset of the total cylinders of an engine (with other cylinders deactivated with closed valves) may be used. For example, electrically actuated intake valves may be used with cam actuated exhaust valves, where cam profile switching is used to provide a zero lift profile.

It will be appreciated that the configurations and routines disclosed herein are exemplary in nature, and that these specific embodiments are not to be considered in a limiting sense, because numerous variations are possible. For example, the above approaches can be applied to V-8, V-6, I-4, I-5, I-6, V-12, opposed 4, and other engine types. Also, the approaches described above are not specifically limited to a dual coil valve actuator. Rather, it could be applied to other forms of actuators, including ones that have only a single coil per valve actuator, and/or other variable valve timing systems, such as, for example, cam phasing, cam profile switching, variable rocker ratio, etc.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for operating an internal combustion engine having at least a first and second cylinder, comprising:
during at least one operating condition,
operating the first cylinder to receive directly injected fuel, mix said fuel with fresh air inducted past an intake valve of the first cylinder, combust said mixture, and exhaust at least a portion of said mixture past an exhaust valve of the first cylinder; and
concurrent with said operation of the first cylinder, operating the second cylinder to hold an intake valve of the second cylinder closed for at least a cycle of said second cylinder, receive directly injected fuel, and then exhaust at least a portion of said fuel past an exhaust valve of the second cylinder to generate unburned reductants in an exhaust of the engine wherein said exhaust valve of the second cylinder is temporarily opened to exhaust at least said portion of directly injected fuel to the exhaust, and a closing timing of said exhaust valve from said temporarily opened position relative to crank angle is varied with an operating parameter while said intake valve of the second cylinder is held closed.

2. The method of claim 1 wherein said first cylinder repeatedly carries out combustion, and said second cylinder is deactivated.

3. The method of claim 1 wherein said holding traps a combusted air and fuel mixture in said second cylinder before said directly injected fuel is injected.

4. The method of claim 3 wherein at least some of said directly injected fuel is injected during piston motion that is in a direction away from the head of said second cylinder.

5. The method of claim 1 wherein said closing timing is varied to vary a pressure level in the second cylinder, and where a timing of an intake valve in said second cylinder is varied with an operating condition.

6. The method of claim 1 wherein an amount of said fuel injected into the second cylinder is varied to vary an exhaust air-fuel ratio.

7. The method of claim 1 wherein said injected fuel into the second cylinder is held in said cylinder for at least one stroke.

8. The method of claim 1 wherein said second cylinder receives multiple injections of directly injected fuel.

9. The method of claim 1 wherein said exhaust valve of said second cylinder is opened and closed more than once to exhaust said directly injected fuel without combusting said fuel in said second cylinder.

10. The method of claim 1 wherein said directly injected fuel is exhausted without combusting said fuel in said second cylinder.

11. A method for operating an internal combustion engine having at least a first, second, and third cylinder, comprising;
operating with said second and third cylinder in a cylinder deactivation mode and said first cylinder carrying out combustion;
during said operation, directly injecting fuel into said second cylinder and temporarily opening an exhaust to provide unburned hydrocarbons to an exhaust of the engine and a closing timing of said exhaust valve from said temporarily opened position is varied with an operating parameter while an intake valve is held closed; and
during said operation, fuel is not directly injected into said third cylinder.

12. The method of claim 11 wherein at least a portion of said directly injected fuel in the second cylinder is exhausted without combusting said fuel while said fuel is in said second cylinder.

13. The method of claim 11 wherein said engine has at least one electrically actuated cylinder valve.

14. The method of claim 11 wherein said second cylinder is at least partially filled with combusted gasses.

15. A system for an engine, comprising:
a first group of cylinders in the engine;
a second group of cylinders in the engine, said second group of cylinders different from said first group of cylinder, where each cylinder has at least a fuel injector coupled thereto to directly inject fuel therein, and where each cylinder has an electrically actuated exhaust valve;
a controller configured to operate each cylinder in the first group to receive directly injected fuel, mix said fuel with fresh air, combust said mixture, and exhaust at least a portion of said mixture past the exhaust valves; and concurrent with said operation of the first group, operate at least one cylinder in the second cylinder group to hold an intake valve closed for at least a cycle, receive directly injected fuel, and then exhaust at least a portion of said fuel past an exhaust valve to generate unburned reductants in an exhaust of the engine, where a number of openings and closings of said exhaust valve is varied as an operating condition while the intake valve is closed.

16. The system of claim 15 wherein said exhaust valve of at least one cylinder in second cylinder group is temporarily opened to exhaust said portion of directly injected fuel to the exhaust and a closing timing of said exhaust valve from said temporarily opened position is varied with an operating condition.

17. The system of claim 16 wherein said operating condition is a pressure level in said cylinder.

18. A method for operating an internal combustion engine having at least a first and second cylinder, comprising:
during at least one operating condition, operating at least one of the first and second cylinders to hold an intake and exhaust valves closed for at least a cycle, and while the intake valve of one of said cylinders is held closed, temporarily opening an exhaust of said cylinders to provide unburned hydrocarbons to an exhaust of the engine and closing said exhaust valve from said temporarily opened position to increase a cylinder pressure of gasses trapped in the cylinder when said pressure falls below a desired level, wherein another of said first and second cylinders is operated to receive directly injected fuel, mix said fuel with fresh air inducted past an intake valve, combust said mixture, and exhaust at least a portion of said mixture to an exhaust manifold.

19. The method of claim 18 wherein the intake valve of at least one of the first and second cylinders is temporarily opened to adjust cylinder pressure.

* * * * *